United States Patent [19]

Ainslie et al.

[11] Patent Number: 4,675,038

[45] Date of Patent: Jun. 23, 1987

[54] GLASS FIBRES AND OPTICAL COMMUNICATION

[75] Inventors: Benjamin J. Ainslie, Ipswich; Clive R. Day, Woodbridge; Keith J. Beales, Ipswich, all of England

[73] Assignee: British Telecommunications Public Limited Company, England

[21] Appl. No.: 856,841

[22] Filed: Apr. 21, 1986

Related U.S. Application Data

[63] Continuation of Ser. No. 648,468, Sep. 7, 1984, abandoned, which is a continuation of Ser. No. 283,801, Jul. 16, 1981, abandoned.

[30] Foreign Application Priority Data

Jul. 17, 1980 [GB] United Kingdom ............... 8023360

[51] Int. Cl.$^4$ ............................................. C03C 25/02
[52] U.S. Cl. .................................... 65/3.12; 65/18.2; 65/900
[58] Field of Search ...................... 65/3.12, 18.2, 30.1, 65/18.3, 900

[56] References Cited

U.S. PATENT DOCUMENTS

| | | | |
|---|---|---|---|
| 4,125,388 | 11/1978 | Powers ................................ | 65/3.12 |
| 4,165,223 | 8/1979 | Powers ................................ | 65/2 |
| 4,165,224 | 8/1979 | Irven et al. ......................... | 65/3.12 |
| 4,263,030 | 4/1981 | Kobayashi et al. ................. | 65/30.1 |
| 4,264,347 | 4/1981 | Shintani et al. .................... | 65/30.1 |
| 4,286,978 | 9/1981 | Bailey et al. ....................... | 65/18.2 |
| 4,298,634 | 11/1981 | Blaszyk et al. ..................... | 65/3.11 |
| 4,304,583 | 12/1981 | Aronson et al. .................... | 65/18.2 |
| 4,334,903 | 6/1982 | MacChesney et al. ............. | 65/3.12 |
| 4,385,802 | 5/1983 | Blaszyk et al. ..................... | 350/96.33 |

FOREIGN PATENT DOCUMENTS

| | | |
|---|---|---|
| 1034818 | 8/1978 | Canada . |
| 2623989 | 12/1977 | Fed. Rep. of Germany . |
| 2418775 | 3/1978 | France . |
| 7908604 | 7/1980 | Netherlands . |
| 2037273 | 7/1980 | United Kingdom . |

OTHER PUBLICATIONS

Yokota et al, "Optical Communication Conference," 17-19 Sep. 1979, pp. 541-544, Conference Proceedings.

Akamatsu et al, "Fabrication of Graded-Index Fibers . . .", Applied Physics Letters, vol. 31, No. 8, Oct. 15, 1977, pp. 515-517.

Ainslie et al, "Preparation of Long Lengths of Ultra-Low-Loss Single-Mode Fibre", Electronics Letters 1979, pp. 411-413.

Chida et al, "Simultaneous Dehydration With Consolidated . . . ", Electronics Letters, vol. 15, No. 25, Dec. 6, 1979, pp. 835-836.

Chemicals Abstracts, vol. 93, No. 2, Jul. 14, 1980, p. 265, abstract 12320n.

*Primary Examiner*—S. Leon Bashore
*Assistant Examiner*—Michael K. Boyer
*Attorney, Agent, or Firm*—Nixon & Vanderhye

[57] ABSTRACT

An improved method of manufacturing an optical fibre by vapor phase deposition of layers of cladding and core material for an optical fibre on the inside of a tubular substrate, followed by heating of the tube to cause it to collapse into a preform and drawing of the preform to form the fibre, includes performing the collapse with the introduction of chlorine gas acting as a drying agent. An alternative to chlorine gas is a vapor which decomposes in situ to yield chlorine without producing a solid deposit.

5 Claims, 4 Drawing Figures

GLASS FIBRES AND OPTICAL COMMUNICATION

This is a continuation of application Ser. No. 648,468 filed Sept. 7, 1984 (now abandoned) which is, in turn, a continuation of application Ser. No. 283,801, filed July 16, 1981 (now abandoned).

BACKGROUND OF THE INVENTION

This invention relates to the manufacture of glass fibres for optical communication. In particular it relates to the vapour-phase deposition of core and cladding material on a substrate and to the subsequent stage in the procedure in which a solid preform of a fibre is produced.

Vapour phase techniques involve the oxidation of a gaseous silicon compound such as $SiCl_4$ to deposit a layer of silicon dioxide on a substrate which, in this invention, comprises the inner surface of a tube. Various dopant materials in a vapour phase are added in a controlled manner to deposit layers which differ in refractive index and in particular a core of a material is formed that has a greater refractive index than the cladding. The substrate is usually pure silica and forms the outer part of the cladding when a fibre is subsequently drawn from the solid preform which comprises the collapsed substrate tube.

$TiO_2$, $GeO_2$, $P_2O_5$, and $Al_2O_3$ are all dopants which have been used in the deposited core layers to increase the refractive index of the glass in that region. By varying the concentration of the dopants in the vapour a gradual refractive index change from the centre to the periphery of the preform can be obtained or alternatively a discrete step in refractive index between the core and cladding regions can be introduced. Both types of profiles are used for multimode fibres. In monomode fibres a step index profile is required in which the core radius is small and in which the difference between the refractive indices of the core and cladding is small compared with a multimode fibre.

Intrinsic losses in $SiO_2$ - $GeO_2$ fibres show a marked variation with respect to the wavelength of the transmitted radiation, and a window in the region 1.1 to 1.7 $\mu m$ is generally recognised as the optimum wavelength range. Thus, in a fibre with a $GeO_2$ doped core a pure $SiO_2$ cladding would seem to be the best choice for a ultra-low-loss ($<1$ dB/km) fibre, since it does not introduce any additional absorbtion mechanisms. This is particularly true in the case of a monomode fibre where 30% of the power in a fibre having a normalised frequency of 2 travels in the cladding.

However, a very high temperature is required for the chemical vapour deposition and sintering of pure silica. Furthermore, heating to this temperature tends to produce distortion in the silica substrate tube. A small amount of $P_2O_5$ added to the deposited silica cladding layers considerably reduces the deposition and sintering temperature, but leads to an increase in the refractive index of the deposited part of the cladding. This higher refractive index region forms part of an undesirable second wave guide with the silica substrate tube acting alone as the cladding. It has previously been proposed, for example, in Electronics Letters 1979 15 pp 411-413, to add a small amount of a refractive index—reducing dopant to the deposited cladding layers to compensate for the effect of the $P_2O_5$ doping. For the additional dopant, fluorine has been proposed. The present invention in a first aspect relates to those fibres having such a compensated or nearly compensated deposited cladding layer based on silicon and including both refractive-index-increasing and refractive-index-decreasing dopants.

Such fibres, whilst alleviating the problems of high deposition temperature and of the formation of a secondary waveguide, suffer from the disadvantage of further absorbtion losses in the transmission spectrum, generally resulting from the vibrational absorbtion of bonds between the dopant material and water. In the case of $P_2O_5$ a loss at ~1.6 $\mu m$ occurs which is the first overtone of the P-OH vibration at 3.05 $\mu m$; and possibly also there is a loss at wavelengths greater than 1.5 $\mu m$ due to the tail of the fundamental P-O vibration at 8.1 $\mu m$.

SUMMARY OF THE INVENTION

The present invention in a first aspect is based on a realisation by the inventors that the compensated dopant concentrations can be decreased either gradually or merely as a single step-wise change so that in the extreme case a layer or layers of substantially undoped silica are deposited adjacent the core.

According to the present invention there is provided an optical fibre having a core and a cladding region, wherein the core comprises silica doped with a refractive-index-increasing substance, and the cladding has an outer region comprising substantially undoped silica, with the remainder of the cladding including regions of silica doped with both refractive-index-increasing and refractive-index-decreasing substances, and wherein the concentration of said dopants in said remainder of the cladding being less towards the core of the fibre so that there exists at least an intermediate region of the cladding where the concentration of said dopants is greater than the remaining inner region of the cladding.

The present invention in a second aspect also relates to the avoidance of absorbtion mechanisms affecting radiation in the transmission spectra of an optical fibre. In particular it relates to the reduction of the water content of the fibre, which is important since the —OH bond has a particular strong absorbtion peak in the 1.4 $\mu m$ region. This aspect of the invention is not limited to the manufacture of fibres having compensated dopants in the cladding layer, but relates to all techniques where layers are deposited in a hollow substrate which is subsequently collapsed to form a preform from which a fibre is drawn.

It is known to use chlorine as a drying agent in optical fibre production, but the inventors have found that surprisingly its use during the collapse of the substrate tube has a significant effect on the resultant -OH concentration in the central region of the preform.

According to the invention as a second aspect there is provided a method of manufacturing optical fibres which includes the step of depositing layers of material for the fibres on the inside of a tubular substrate, and in which method the subsequent heating of the tube to cause it to collapse is carried out in an atmosphere including chlorine acting as a drying agent.

Preferably, the chlorine is introduced as chlorine gas, or as a material that decomposes to give chlorine gas without depositing any material on the previously deposited layers.

BRIEF DESCRIPTION OF THE DRAWINGS

Embodiments of the invention will now be described by way of example only, with reference to the accompanying drawings. In the drawings.

DETAILED DESCRIPTION OF THE INVENTION

In the process known as the MCVD (modified chemical vapour deposition) process, low loss optical fibres are produced from a solid preform. The preform itself is formed by collapsing a tubular substrate on the inside of which layers of material are deposited by thermal oxidation of chemical vapours. The deposited material is in the form of the solid products of the vapour phase reaction which becomes sintered to a glass layer during the traverse of the heat source.

Figure 1:
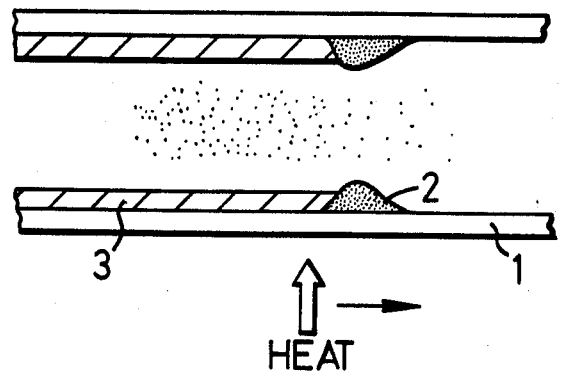
FIG. 1 is a diagrammatic axial section through a substrate tube.

Referring to FIG. 1, a substrate tube 1 is formed from pure silica and is rotated about its axis over a source of heat, typically an oxy-hydrogen burner. Combinations of vapours are introduced at one end of the tube and the heater is moved slowly in the direction of vapour flow. The vapour is primarily $SiCl_4$ but includes chlorides of the dopant substances such as $GeCl_4$ and $POCl_3$. Oxidation of the vapour causes solid products 2 to be deposited inside the tube in a region adjacent the source of heat. The actual deposition mechanism lies between a deposition of soot formed in the vapour and the mechanism of the unmodified process where the solid products are deposited where the hot vapour contacts the less hot region of the substrate tube adjacent the heat source. As the heater passes these regions the deposited material is sintered to form a glass layer 3.

As was discussed above the use of pure silica as the cladding material whilst desirable in some respects causes problems as a result of the high temperature required in subsequent stages. Thus a refractive-index-compensated combination of $P_2O_5$ and F dopants is desirable in the deposited layers of cladding to reduce the temperature required.

Figure 2:
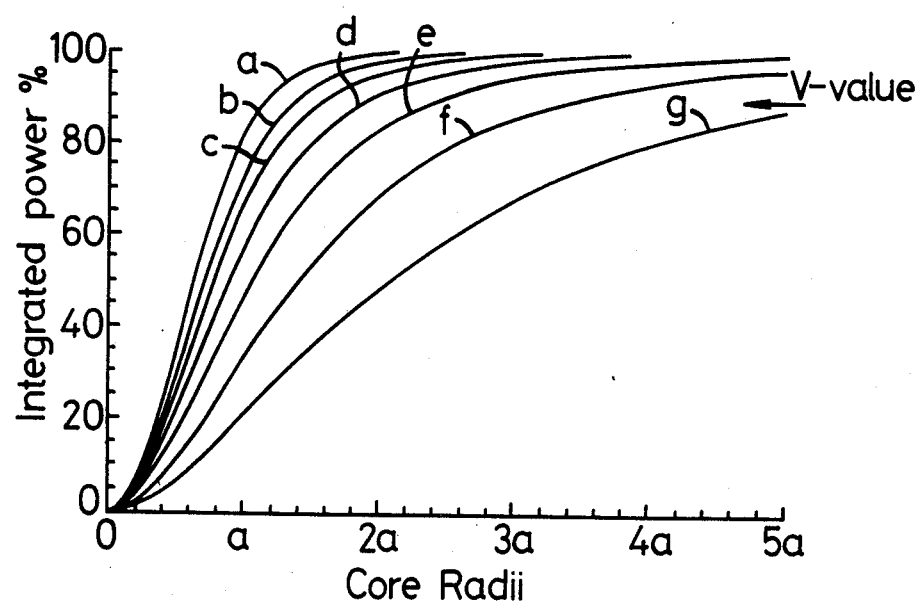
FIG. 2 is a graph of integrated power against core radius for fibres having different values of normalised frequency.

In a single-mode fibre which is required to have a low loss at both 1.3 $\mu$m and 1.6 $\mu$m, the $LP_{11}$ mode of propogation preferably has a cut off at a wavelength between 1.1 to 1.2 $\mu$m. To achieve this the normalised frequency V, given by the expression:

$$(2\pi a/\lambda)(n_1^2 - n_2^2)^{\frac{1}{2}}$$

where $n_1$, $n_2$ are the refractive indices of the core and cladding, $\lambda$ is the operating wavelength, and a is the core radius; has a value of ~2.2 at 1.3 $\mu$m and ~1.8 at 1.6 $\mu$m. FIG. 2 shows the integrated power profiles of a step-index single-mode fibre as a function of fibre radius for different values of V, from which it can be seen that for V=1.8 only ~67% of the power is contained in the core region, whereas ~88% of the power is contained within a radius of 1.5a and ~96% within a radius of 2a.

Therefore, if the cladding dopants can be diminished or eliminated out to a radius 1.5a or 2a then the effect of the P-OH and P-O bonds can be greatly reduced.

Figure 3:
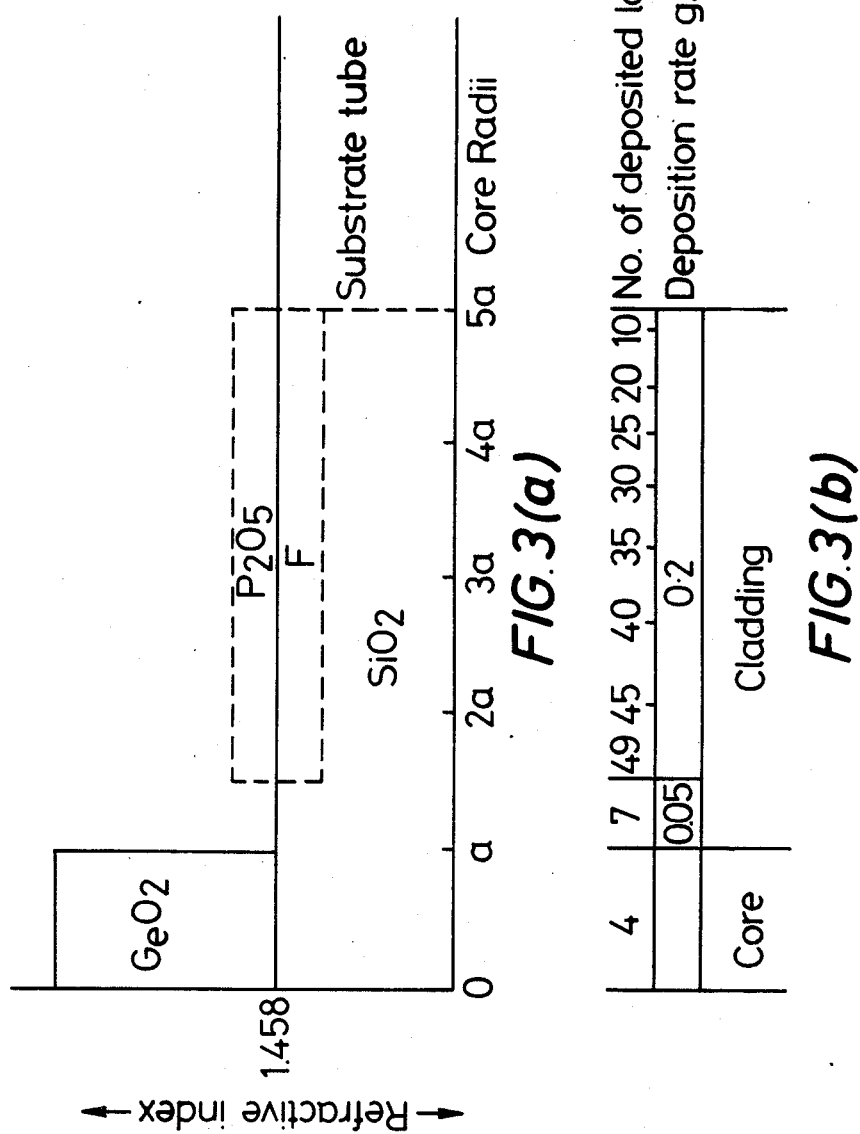
FIG. 3(a) is a graph of refractive index against core radius for a fibre made in accordance with a first aspect of the invention.
FIG. 3(b) is a diagram associated with FIG. 3(a) giving figures for the deposited layers at various radial distances.

Accordingly, in this method the composition of the vapour at the beginning of the deposition includes F and $POCl_3$ together with the major component, $SiCl_4$, until 49 layers of cladding are deposited between radii of 5a and 1.5a. This is illustrated in FIGS. 3(a) and (b). The supply of doping vapours is then extinguished so that 7 layers of pure $SiO_2$ are deposited in the region between radii a to 1.5a. Finally $GeCl_4$ is added to the vapour to deposit the 4 layers comprising the core. A deposition temperature for the pure $SiO_2$ inner cladding that is 200° C. greater than that for the doped cladding has been found to be satisfactory, and a deposition rate for the doped cladding of 4 times that for the pure $SiO_2$ region was also found to be suitable.

In this example the radial thickness of the pure silica layer is limited to 0.5a to minimise the heating required and hence to minimise the possibility of serious distortion of the substrate tube. Further advantageous extension outwards of the pure silica layer may be possible but is likely to require pressurisation to reduce distortion of the substrate. Alternatively the concentration of the compensated dopants may be gradated in the region adjacent the pure silica layer, so that a compromise between the reduction of $P_2O_5$ and the increase in deposition temperature obtains. In a further alternative the concentration of the compensated dopants in the cladding may be gradually diminished in a direction toward the core without being eliminated, and so without a pure silica layer being formed.

Once the deposition is complete the temperature is increased to 1,700°–1,900° C. to cause the collapse of the tube to a solid preform. In accordance with the second aspect of the invention chlorine gas is introduced upon the termination of the deposition stage and then continued during the collapse stage. This chlorine vapour is of similar high purity to the other materials used and has been found by the inventors to have a significant drying effect at this stage in the process. During the collapse stage —OH concentration tends to increase in the tube material, particularly at the exposed, most recently deposited, core layers. This may be due to absorbtion from any remaining hydrogen containing impurities in the carrier gas or by back diffusion. It will be appreciated that this contamination is particularly important in monomode fibres where the transmitted power is concentrated at the centre of the fibre.

Figure 4:
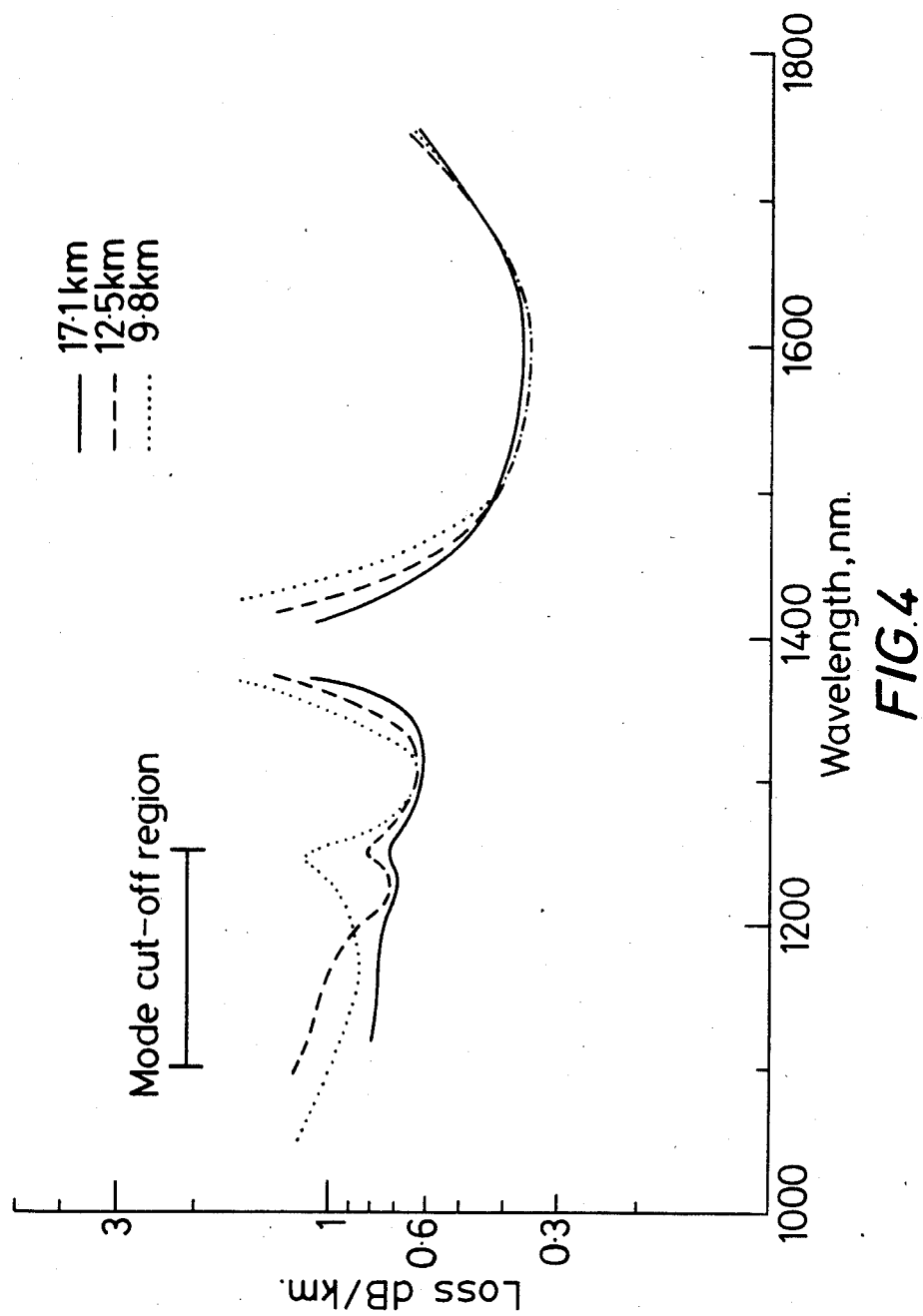
FIG. 4 is a graph of loss per unit length against transmitted wavelength for a number of fibres.

FIG. 4 illustrates the loss spectra of three lengths of fibres produced by collapsing the substrate tube and drawing the fibre in one operation, and in which procedure, during the collapse of the preform tube, chlorine was used as a drying agent. The —OH content estimated from the peaks at 1.25 $\mu$m in long fibre lengths and from measurements at 1.39 $\mu$m made on 1 km lengths of fibres was 30 to 100 parts in $10^9$. The intensity of the —OH overtone at 1.39 $\mu$m has been reduced to <3 dB/km, and further reduction should be possible.

Although in the method described, the chlorine used as a drying agent is introduced as chlorine gas, it could also be obtained from the decomposition of a vapour, such as thionyl chloride which decomposes without causing further deposition. Vapours, such as $SiCl_4$, may also be used and supply may then be continued from the deposition stage, but in such a case the extra deposition of vitreous layers must be accommodated.

We claim:

1. In a method of manufacturing a monomode optical fibre preform which comprises the steps of vapour phase deposition of layers of cladding and layers of core material for the fibre on the inside of a tubular substrate by the MCVD (modified chemical vapor deposition) method, sintering such deposited layers, subsequently heating the tube to cause it to collapse into a preform of the fibre wherein the fiber core consists only of said vapour phase deposited layers of core material, the improvement which comprises introducing chlorine gas into the environment of said deposited and sintered layers of core material, said chlorine gas acting as a drying agent during said step of collapsing the tubular substrate into said preform to reduce OH concentration in said core material.

2. A method according to claim 1, wherein the chlorine is introduced only after deposition has been completed.

3. In a method of manufacturing a monomode optical fibre preform which comprising the steps of vapour phase deposition of layers of cladding and layers of core material for an optical fibre on the inside of a tubular substrate, sintering such deposited layers, and subsequently heating the tube to cause it to collapse into the preform wherein the fiber core consists only of said vapour phase deposited layers of core material, the improvement which comprises introducing chlorine gas into the environment of said deposited and sintered layers of core material, said chlorine gas acting as a drying agent during said step of collapsing the tubular substrate into said preform to reduce OH concentration in said core material.

4. A method according to claim 3, wherein the chlorine is introduced only after deposition has been completed.

5. In a method of manufacturing a monomode optical fibre preform which comprises the steps of vapour phase deposition by the MCVD method of layers of cladding and layers of doped core material for the fibre on the inside of a tubular substrate, sintering such deposited layers, subsequently heating the tube to cause it to collapse into a preform of the fibre wherein the fiber core consists only of said vapour phase deposited layers of doped core material, the improvement which comprises introducing a drying gas which, does not materially remove dopant from said doped core material, into the environment of said deposited and sintered layers of doped core material during said step of collapsing the tubular substrate into said preform, said drying gas acting as a drying agent during said collapsing step to reduce OH concentration in said core material.

* * * * *